US010508672B2

(12) United States Patent
Chang et al.

(10) Patent No.: US 10,508,672 B2
(45) Date of Patent: Dec. 17, 2019

(54) JOINT WITH CURVED TENON

(71) Applicants: Benjamin Che-Ming Chang, San Jose, CA (US); Tian Tian Yang, North Vancouver (CA)

(72) Inventors: Benjamin Che-Ming Chang, San Jose, CA (US); Tian Tian Yang, North Vancouver (CA)

( * ) Notice: Subject to any disclaimer, the term of this patent is extended or adjusted under 35 U.S.C. 154(b) by 0 days.

(21) Appl. No.: 16/298,153

(22) Filed: Mar. 11, 2019

(65) Prior Publication Data
US 2019/0203755 A1 Jul. 4, 2019

Related U.S. Application Data

(62) Division of application No. 15/013,904, filed on Feb. 2, 2016, now Pat. No. 10,273,999.

(51) Int. Cl.
*F16B 12/10* (2006.01)
*F16B 12/44* (2006.01)
*A47B 13/00* (2006.01)
*F16B 1/00* (2006.01)

(52) U.S. Cl.
CPC ............ *F16B 12/10* (2013.01); *A47B 13/003* (2013.01); *F16B 1/00* (2013.01); *F16B 12/44* (2013.01); *F16B 2001/0035* (2013.01)

(58) Field of Classification Search
CPC ..... A47B 13/003; A47B 13/00; A47B 87/002; A47B 2230/0074; A47B 2230/0081; A47B 2230/0088; F16B 12/10; F16B 12/44; F16B 12/36; F16B 12/12; F16B 12/125; Y10T 403/55; Y10T 403/533
See application file for complete search history.

(56) References Cited

U.S. PATENT DOCUMENTS

| 1,734,340 | A | * | 11/1929 | Overton | F16B 12/48 248/163.1 |
| 3,469,869 | A | * | 9/1969 | Ramakers | F16B 12/14 403/264 |
| 4,175,884 | A | * | 11/1979 | Cheng | F16B 12/125 403/353 |
| 4,261,665 | A | * | 4/1981 | Hsiung | F16B 12/14 403/231 |
| 4,701,065 | A | * | 10/1987 | Orosa | A47C 5/02 403/263 |
| 6,503,020 | B1 | * | 1/2003 | Mascioletti | E04B 1/2604 403/231 |

(Continued)

FOREIGN PATENT DOCUMENTS

| EP | 2208895 A2 * | 7/2010 | ............ F16B 7/0446 |
| WO | WO-0233271 A1 * | 4/2002 | .......... B27M 3/0066 |

*Primary Examiner* — Jonathan P Masinick
(74) *Attorney, Agent, or Firm* — Douglas L. Weller

(57) ABSTRACT

A joint for furniture includes furniture piece that has a first hole that extends through a surface of the furniture piece and out the furniture piece, and that has a second hole with an opening in the furniture piece. A leg is fitted to the furniture piece. The leg has a hole. A curved tenon piece includes a head. The curved tenon piece is curved sufficiently to allow the curved tenon to enter the first hole through the surface of the furniture piece, to exit the first hole, to extend through the hole in the leg and to enter into the second hole so that the head leg is held snugly to the furniture piece by the curved tenon piece.

14 Claims, 23 Drawing Sheets

(56) References Cited

U.S. PATENT DOCUMENTS

| | | | | |
|---|---|---|---|---|
| 7,448,820 B1* | 11/2008 | Faber | ............... | F16B 7/0453 |
| | | | | 403/240 |
| 9,976,585 B2* | 5/2018 | Tian | ............... | F16B 12/125 |
| 2008/0181734 A1* | 7/2008 | Sullivan | ............... | B27G 13/16 |
| | | | | 408/1 R |
| 2012/0045278 A1* | 2/2012 | Schooley | ............... | F16B 12/125 |
| | | | | 403/381 |

* cited by examiner

JOINT WITH CURVED TENON

BACKGROUND

Ready-to-assemble (RTA) furniture is furniture that is packaged to be assembled by a customer who is an end user. Assembly of such furniture often requires customers to assemble panel boards together using cam locks and connecting bolts. For example, in order to secure two panel boards, one or more connecting bolts need to be pushed or screwed into the holes on one panel board, and connected to one or more matching cam locks inserted on another panel board. Fastening one or more connecting bolts to one or more cam locks forms a connecting device to hold the two panel boards together.

This installation process can be very complicated and require the customer/assembler to have enough strength and technique to secure the connecting bolts orthogonally into the panel, and fasten the bolts and the cam locks together. Also, the assembling process often requires tools, such as screwdriver, wrench, and hammer. There exists furniture that can be assembled using tool-less assembly joints; however, the result can be assembled furniture with comprised quality in appearance or structural stability.

DESCRIPTION OF THE EMBODIMENT

Figure 1:
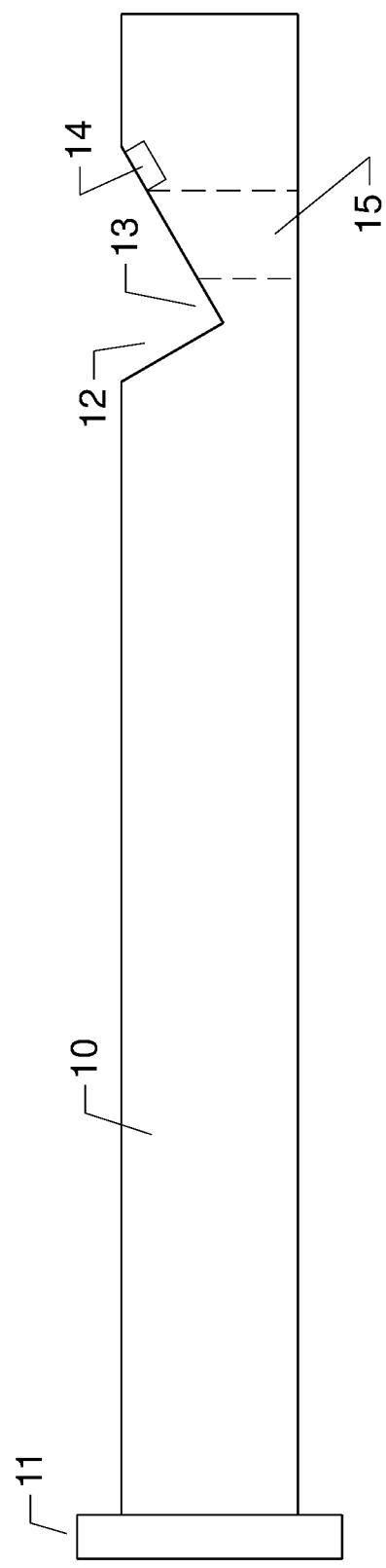
FIG. 1 shows a mortise piece in accordance with an implementation.

Various implementations of joints are shown by which parts of furniture may be connected together. The joints are particularly useful for ready-to-assemble furniture and other types of furniture.

For example, a mortise and tenon joint, includes a mortise piece and a tenon piece. The mortise piece includes a cut-out region. The cut-out region includes a surface. A mortise is located at the cut-out region. The tenon piece includes a tenon sized to fit within the mortise. The tenon piece has a surface that matches the surface of the cut-out region so that when the tenon is within the mortise, the tenon piece can be rotated into a first orientation so that the surface of the tenon piece is flush with the surface of the cut-out region, and the tenon piece can be rotated into a second orientation so that the surface of the tenon piece is not flush with the surface of the cut-out region.

For example, in an implementation, a magnet bond system includes a first region and a second region that are magnetically attracted to one another. The first region is located at the surface of the cut-out region and the second region is located at the surface of the tenon piece so that when the tenon piece is flush with the surface of the cut-out region, the first region is in close proximity to the second region forming a strong magnetic bond holding the tenon piece to the mortise piece. When the tenon piece is not flush with the surface of the cut-out region, the first regions is not in close proximity to the second region and the magnetic bond holding the tenon piece to the mortise piece is greatly diminished. This allows easy removal of the tenon piece from the mortise piece.

For example, the first region is a magnet embedded in the surface of the tenon piece and the second region is formed of metal embedded in the surface of the cut-out region of the mortise piece.

For example, the mortise piece includes a head that has a larger diameter than a remainder of the mortise piece.

For example, a second tenon piece includes a second tenon sized to fit within a second mortise located at a second cut-out region of the mortise piece. In one implementation, the tenon of the tenon piece extends from a table leg into a tabletop and the second tenon of the second tenon piece extends into table leg but not into the tabletop.

For example, a third tenon piece includes a third tenon sized to fit within a third mortise located at a third cut-out region of the mortise piece.

In an alternative implementation, a joint for furniture includes a furniture surface. The furniture surface has a first hole that extends through a top of the furniture surface and out the furniture surface, and has a second hole with an opening in the furniture surface. A leg fitted to the furniture surface includes a hole. A curved tenon piece curving more than 90 degrees includes a head. The curved tenon piece is shaped to enter the first hole through the top of the furniture surface, to exit the first hole, to extend through the hole in the leg and to enter into the second hole so that the head is flush with the top of the furniture surface.

For example, a magnetic bond between the curved tenon piece and the leg is established when the head of the curved tenon piece is flush with the top of the furniture surface.

For example, the leg is fitted to the top of the surface by use of a tenon of the leg that is inserted into a mortise in a bottom of the mortise surface. For example, the hole of the curved tenon piece is located below the furniture surface. For example, the furniture is a table and the furniture surface is a tabletop. Alternatively, the furniture is a chair and the furniture surface is a seat. Alternatively, the furniture is a desk and the furniture surface is a desk top. Alternatively, the furniture is another type of furniture with a furniture surface.

In one implementation, the second hole also extends through the top of the furniture surface. For example, a second curved tenon piece curves more than 90 degrees and includes a head. The second curved tenon is shaped to enter the second hole through the top of the furniture surface, to exit the second hole, to extend through the hole in the leg and to enter into the second hole so that the head of the second curved tenon piece is flush with the top of the furniture surface.

For example, a magnetic bond between the curved tenon piece and the second curved tenon piece is established when the head of the curved tenon piece is flush with the top of the furniture surface and the head of the second curved tenon piece is flush with the top of the furniture surface FIG. 1 shows a mortise piece 10 having a head 11. A mortise 15 is shaped to receive a tenon. A cut-out region 12 includes a slotted wall 13 and a metal or magnet region 14. For example, mortise piece 10 is composed of some combination of wood, plastic, metal or some other material suitable for forming a mortise and tenon joint. For example, a cross section of mortise piece 10 is square or round or some other suitable shape.

Figure 2:
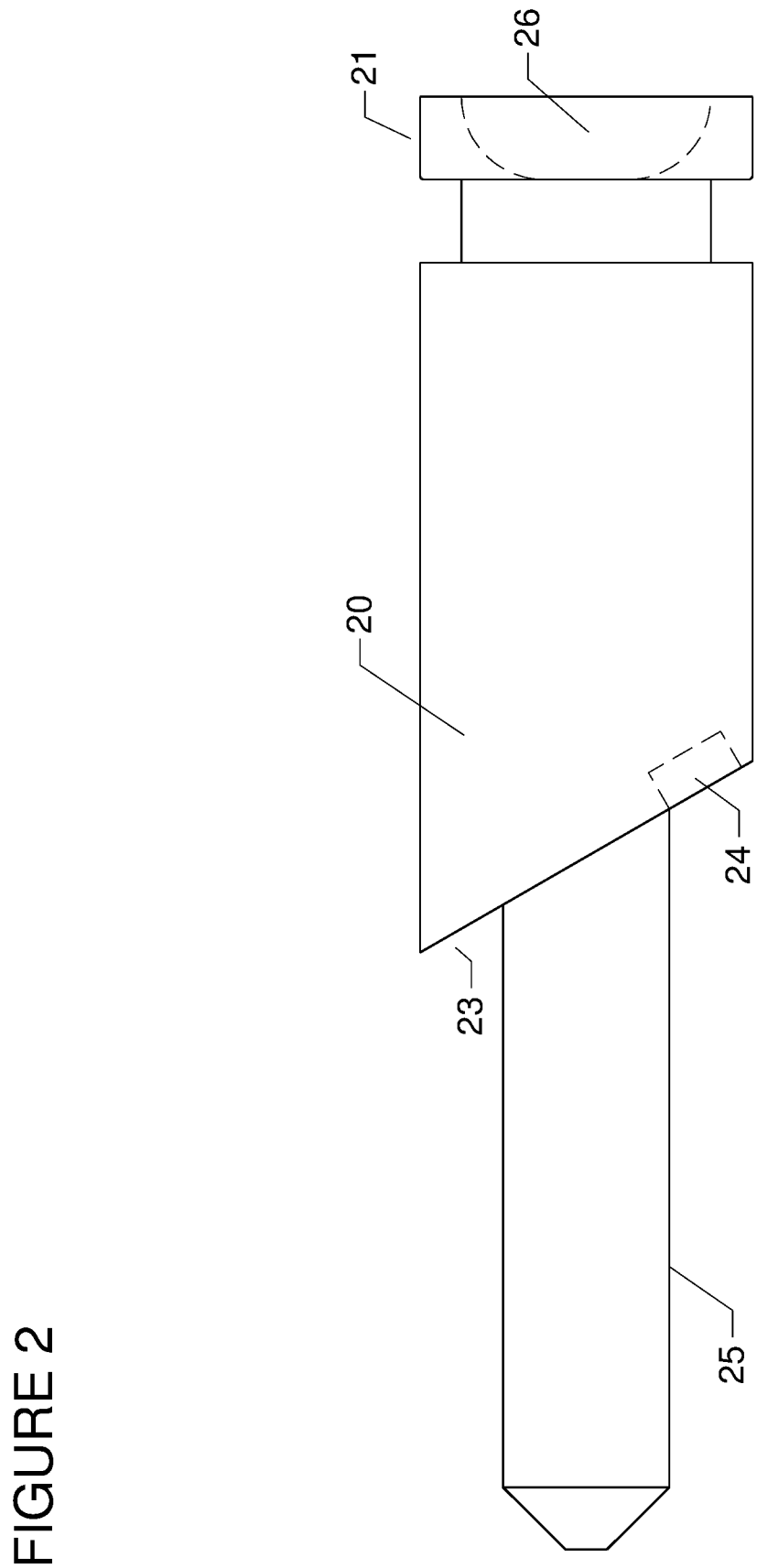
FIG. 2 shows a tenon piece in accordance with an implementation.

FIG. 2 shows a tenon piece 20 having a head 21. Within head 21 is a slot 26 that can be used by a user to rotate tenon piece 20, for example by inserting a coin in slot 26. A tenon 25 is shaped to fit within mortise 15. A slotted wall 23 and a metal or magnet region 24 are shaped to match slotted wall 13 and metal or magnet region 14. For example, tenon piece 20 is composed of some combination of wood, plastic, metal or some other material suitable for forming a mortise and tenon joint. For example, a cross section of tenon piece 20 is round or some other suitable shape. Tenon piece 20 can operate as a thread-less bolt.

Figure 3:
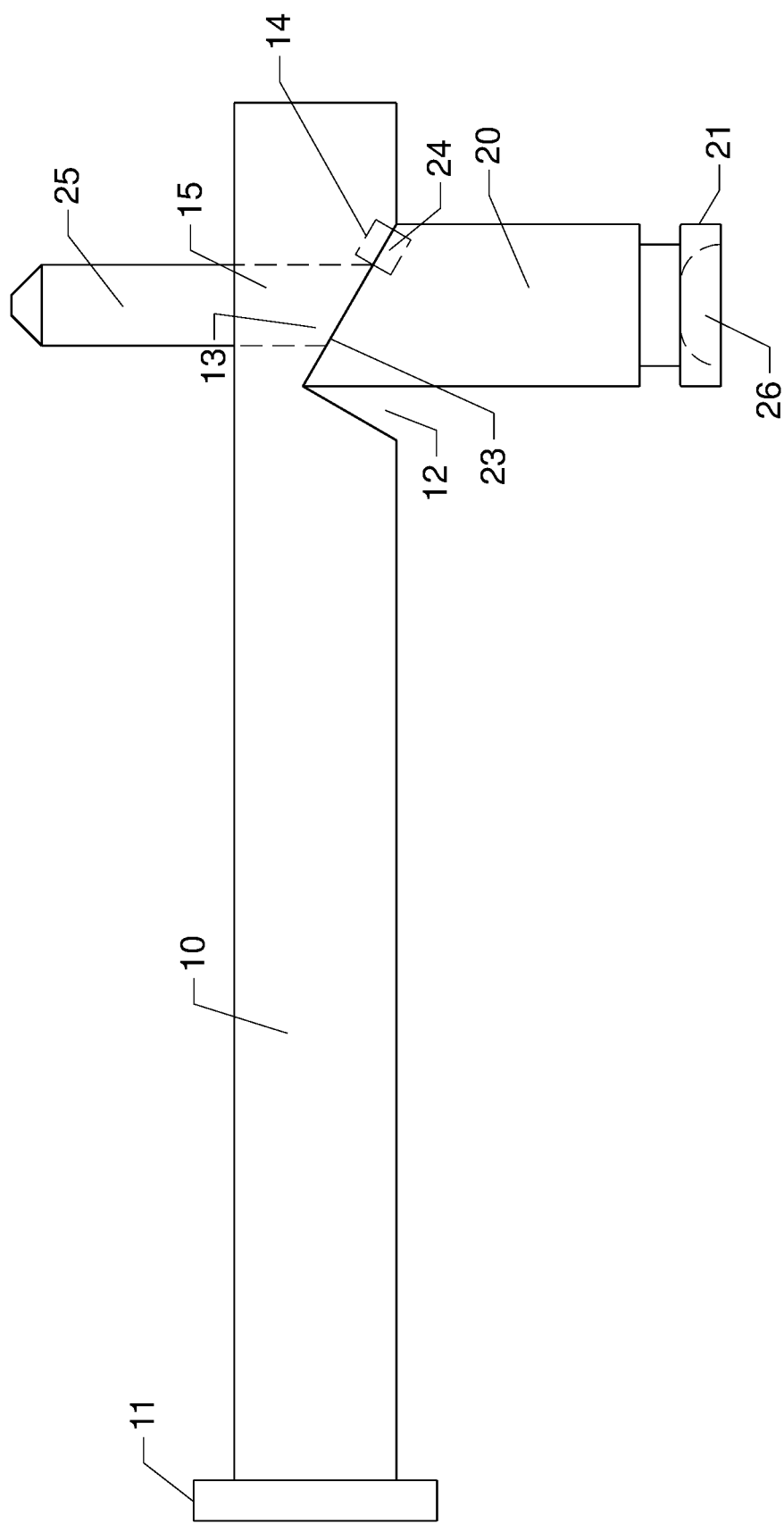
FIG. 3 shows a joint formed between a mortise piece and a tenon piece in accordance with an implementation.

FIG. 3 shows a joint formed between mortise piece 10 and tenon piece 20. Slotted wall 23 is flush against slotted wall 13. Metal or magnet region 24 is flush with metal or magnet region 14. For example, region 24 is an embedded magnet and region 14 is embedded metal. The magnetic bond formed by region 24 and region 14 holds tenon piece 20 snug within slot 12 of mortise piece 10. When a user places a coin, key, screwdriver or other material into slot 26 and twists, tenon piece 20 rotates within slot 12 so that slotted wall 23 is no longer flush with slotted wall 13. This separates region 14 and region 15 breaking the magnetic bond that holds tenon piece 20 to mortise piece 10. This makes it easy to remove tenon piece 20 from mortise piece 10.

The magnetic bond required to hold tenon piece 20 to mortise piece 10 is relatively minimal as the magnetic bond between tenon piece 20 and mortise piece 10 is not weight bearing. For example the magnet used may be implemented by a 2 millimeter (mm) diameter disk magnet that is 1 mm thick. For example, the magnet can be composed of ferromagnetic material, such as iron, steel or nickel.

Figure 4:
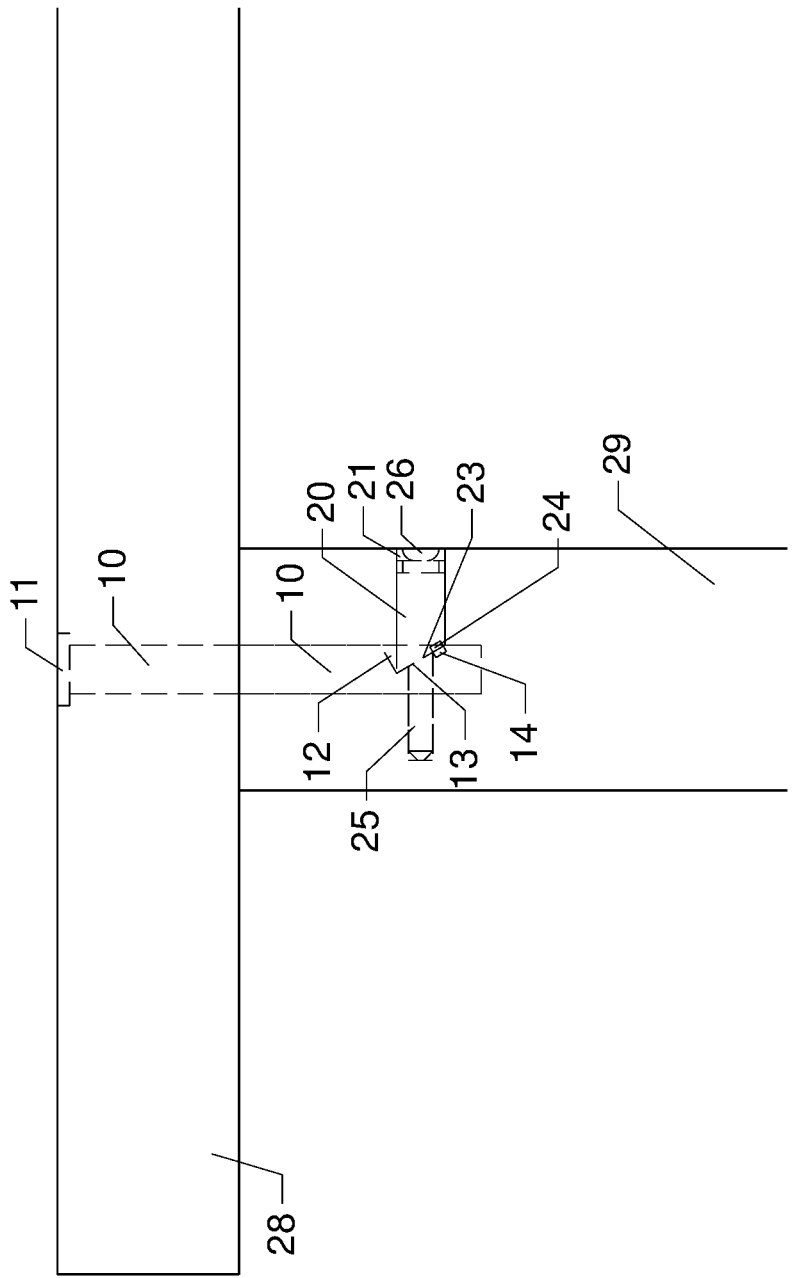
FIG. 4 and FIG. 5 show a leg being attached to a table by a joint formed between a mortise piece and a tenon piece in accordance with an implementation.
Figure 5:
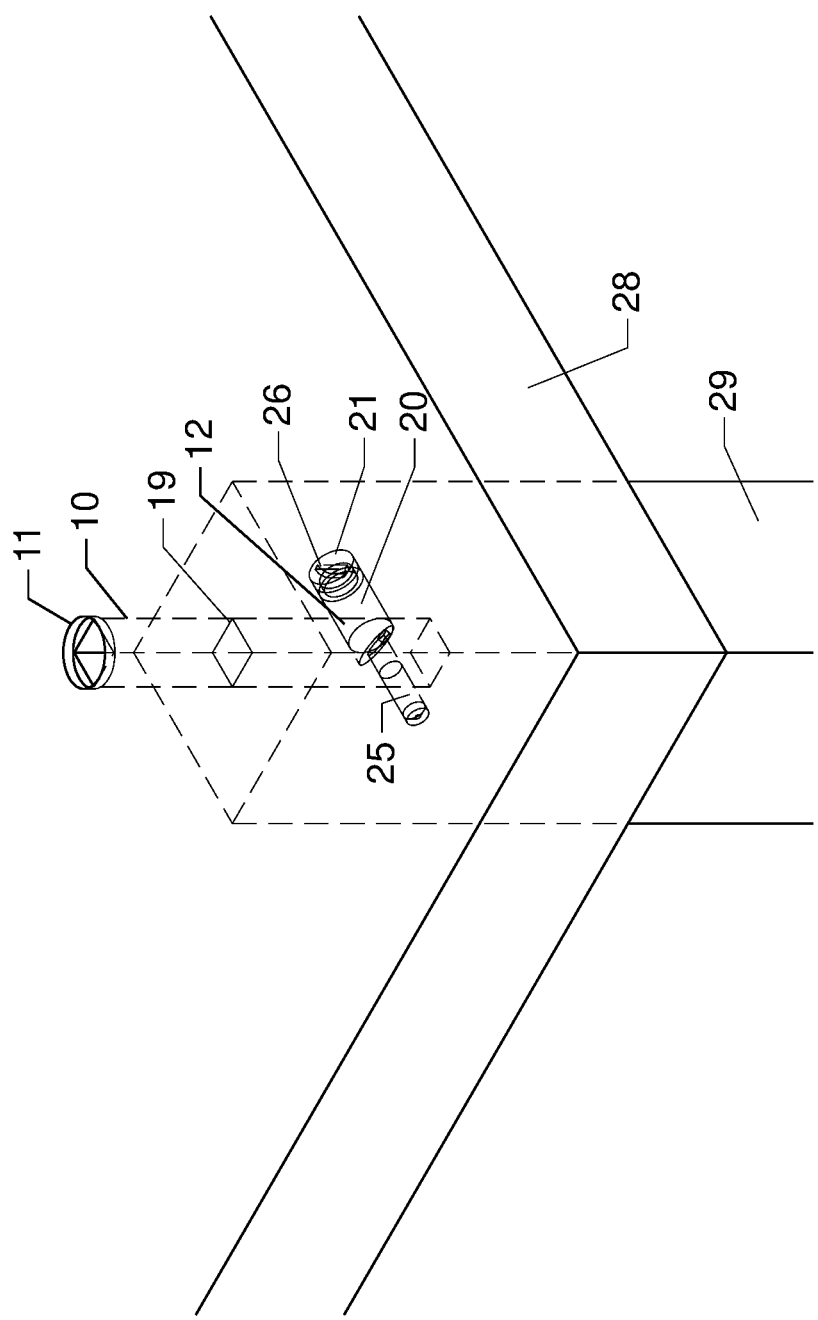

FIG. 4 and FIG. 5 show mortise piece 10 and tenon piece 20 used to hold a leg 29 to a tabletop 28. Mortise piece 10 is placed through a hole within tabletop 28. The hole is counterbored so that head 11 of mortise piece 10 is flush with the surface of tabletop 28. Mortise piece 10 extends into a hole within leg 29. A perpendicular hole within leg 29 is shaped to receive tenon piece 20. Slotted wall 23 is flush against slotted wall 13. The magnetic bond formed by region 24 and region 14 holds tenon piece 20 snug within slot 12 of mortise piece 10. When a user places a coin or screwdriver in slot 26 and twists, tenon piece 20 rotates within slot 12 so that slotted wall 23 is no longer flush with slotted wall 13. This separates region 14 and region 15 breaking the magnetic bond that holds tenon piece 20 to mortise piece 10. This makes it easy to remove tenon piece 20 from mortise piece 10.

While in FIG. 4 and FIG. 5, mortise piece 10 and tenon piece 20 are shown used holding a leg to a tabletop, mortise piece 10 and tenon piece 20 can be used for joints in other types of furniture. For example, mortise piece 10 and tenon piece 20 can be used for joints in desks, bed frames, storage units, shelves, chairs and other types of furniture used for residential, office, dormitory, hospital, schools and so on. As the joint system illustrated by mortise piece 10 and tenon piece 20 can be assembled and disassembled easily without requiring the use of special tools, it makes the installation procedures of ready-to-assemble furniture friendly for people in different age groups. The joint system illustrated by mortise piece 10 and tenon piece 20 provide a strong joint that is well suited for use with relatively weak materials, since the attachment is made via joint system. Panels of furniture body that are joined by the joint system illustrated by mortise piece 10 and tenon piece 20 can be of a rigid material with substantial strength, such as various types of hardwood, metal or hard plastic. The holes required for integration with mortise piece 10 and tenon piece 20 can be machined using drills and mortise drills. Various panels, can be manufactured to be identical to one another and interchangeable, thus reducing the variety of different parts that need to be manufactured.

Figure 6:
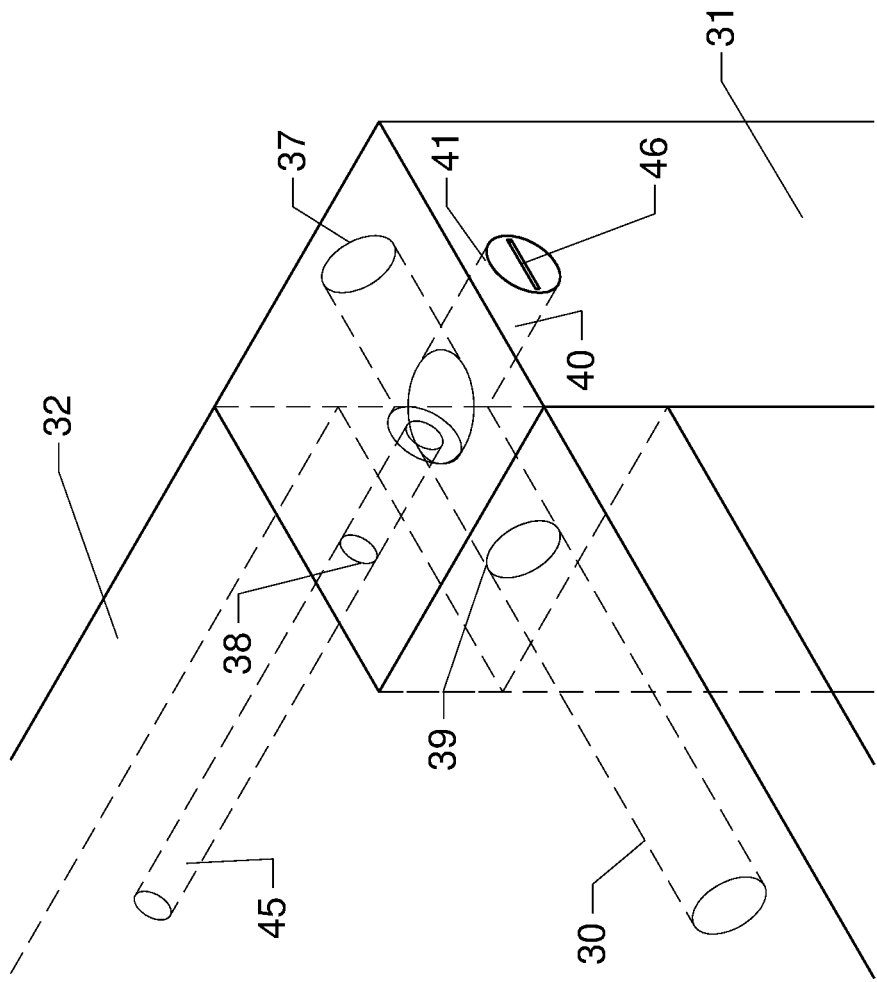
FIG. 6 and FIG. 7 show a leg being attached to a table by a joint formed between a mortise piece and a tenon piece in accordance with an implementation.
Figure 7:
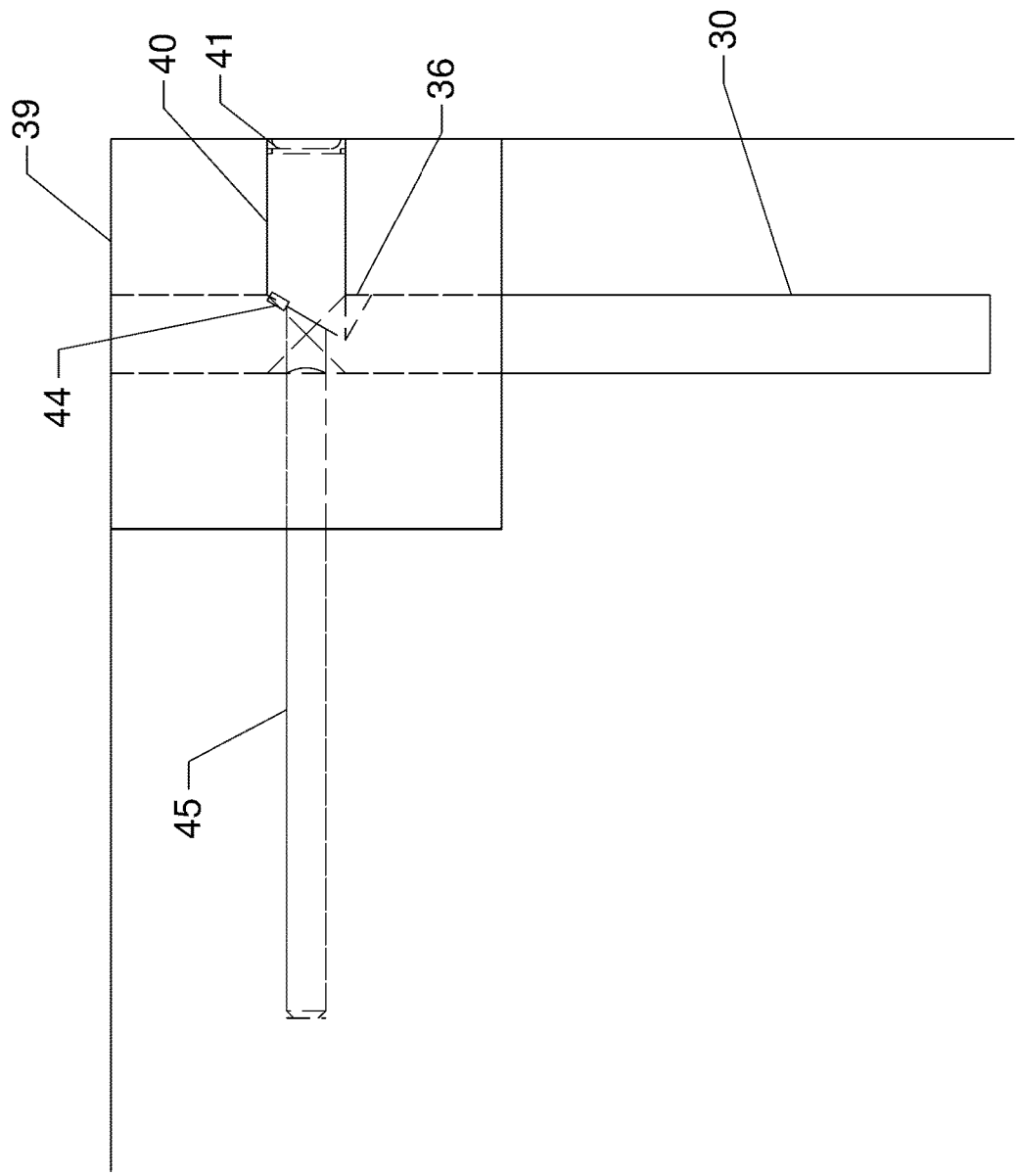

Variations of the joint system illustrated by mortise piece 10 and tenon piece 20 can also be used. For example, FIG. 6 and FIG. 7 show a mortise piece 30 and a tenon piece 40 used to hold a leg 31 to a tabletop 32. Mortise piece 30 is placed through a hole in leg 31 and enters tabletop 32 through a hole 39. A head 37 is flush in below a surface of leg 31. A perpendicular hole within leg 31 is shaped to receive tenon piece 40. Tenon 45 of tenon piece 40 extends through a hole 38 into tabletop 32. A magnetic bond is used to hold tenon piece 40 snug against mortise piece 30. A recessed magnet 44, shown in FIG. 7, provides the magnetic bond. A head 41 of tenon piece 40 is flush in below a surface of leg 31. When a user places a coin or screwdriver in a slot 46 and twists, tenon piece 40 rotates break the magnetic bond that holds tenon piece 40 to mortise piece 30. This makes it easy to remove tenon piece 40 from mortise piece 30.

Figure 8:
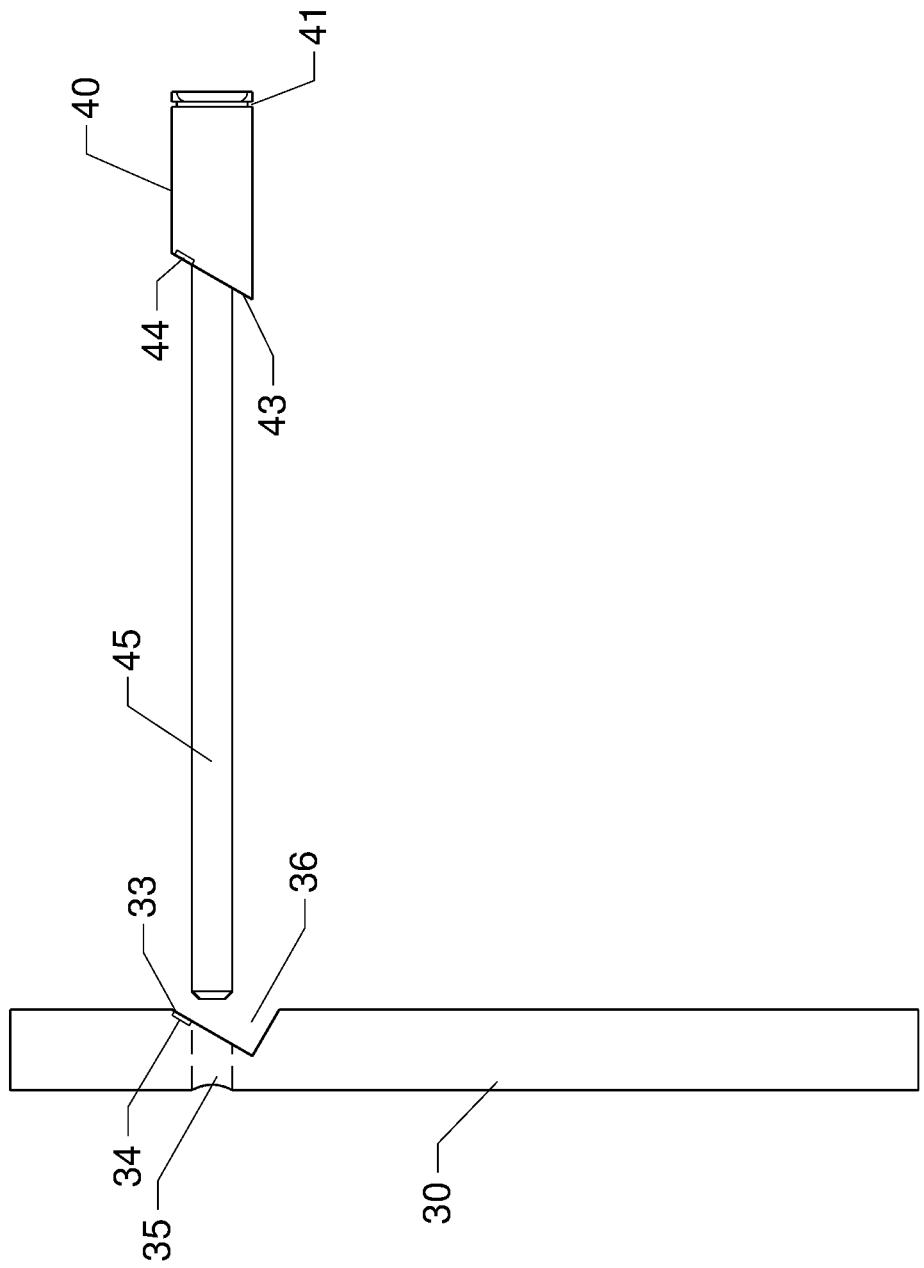
FIG. 8 shows a joint formed between a mortise piece and a tenon piece in accordance with an implementation.

FIG. 8 shows additional detail mortise piece 30 and a tenon piece 40. A cut-out region 36 of mortise piece 30 includes a slotted wall 33 and a metal or magnet region 34. A slotted wall 43 and a metal or magnet region 44 of tenon piece 40 are shaped to match slotted wall 33 and metal or magnet region 34. Tenon 35 is inserted into mortise 35.

Figure 9:
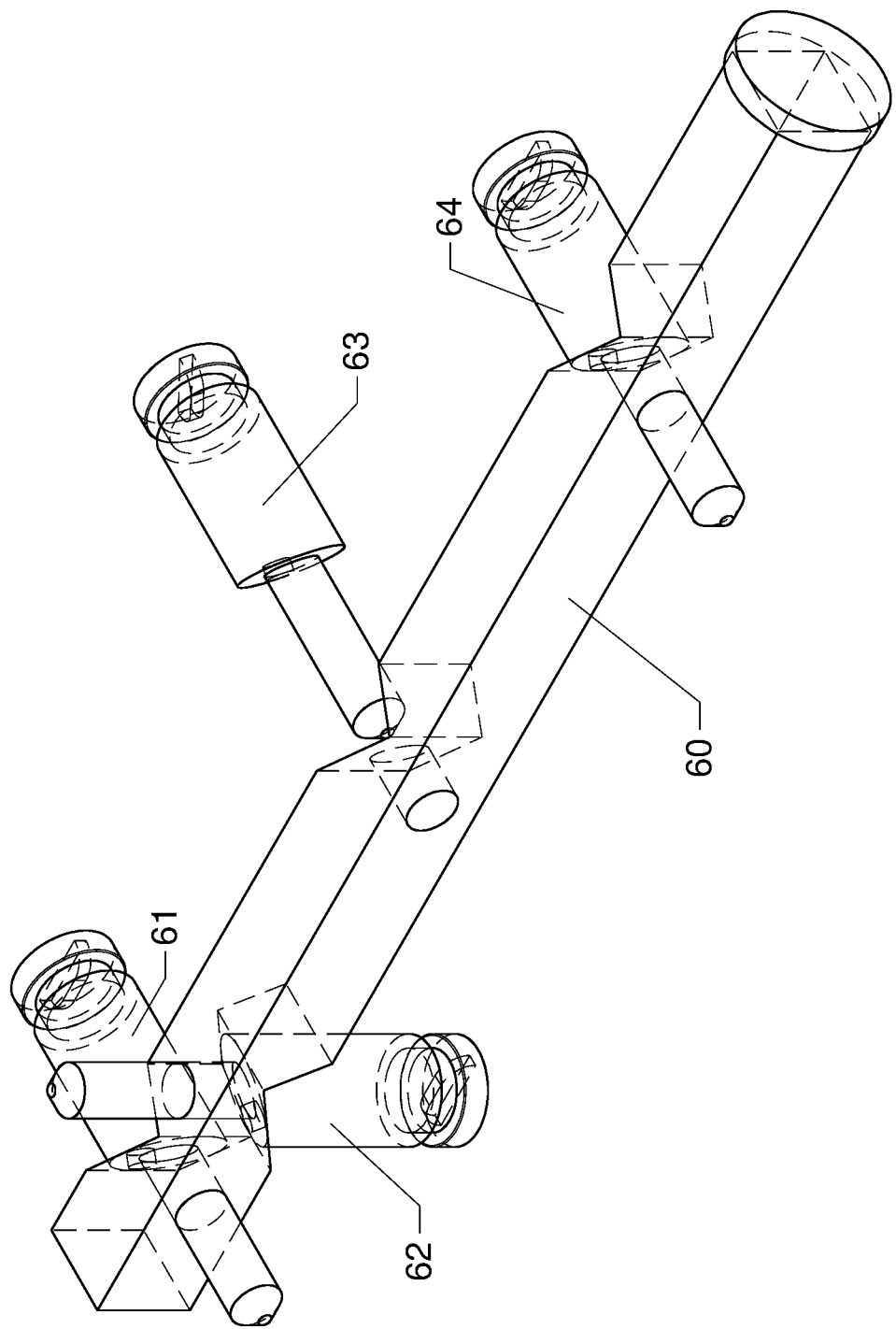
FIG. 9 shows joints formed between a mortise piece and multiple tenon pieces in accordance with an implementation.

FIG. 9 shows how a single mortise piece 60 can form joints with multiple tenon pieces, as illustrated by a tenon piece 61, a tenon piece 62, a tenon piece 63 and a tenon piece 64. For example, mortise piece 60 and tenon pieces 61, 62, 63 and 64 are each composed of some combination of wood, plastic, metal or some other material suitable for forming a mortise and tenon joint.

Figure 10:
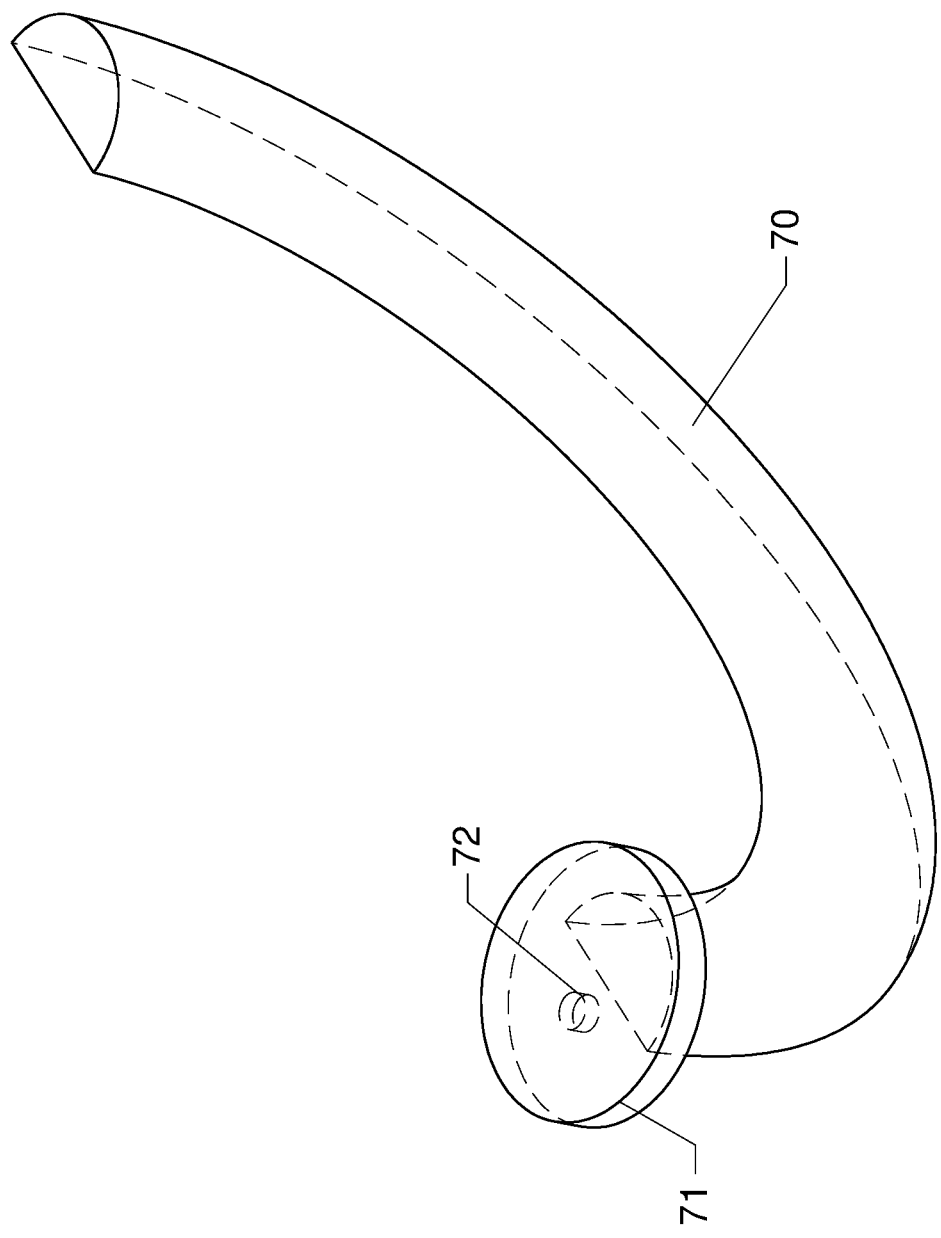
FIG. 10 shows a curved tenon piece in accordance with an implementation.

FIG. 10 shows a curved tenon piece 70 having a head 71 and an embedded magnet 72.

Figure 11:
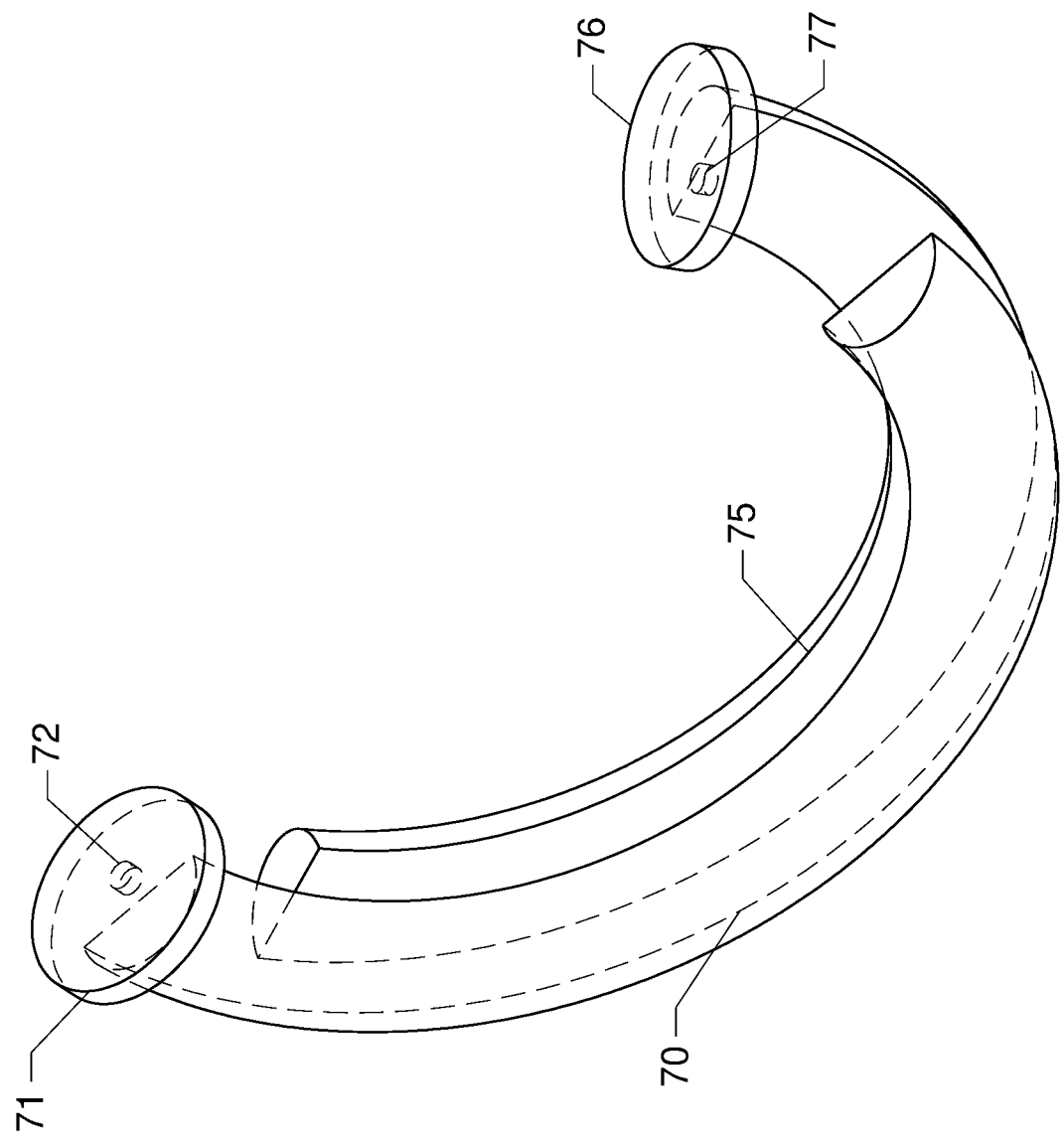
FIG. 11 shows two curved tenon pieces in a joint forming configuration in accordance with an implementation.

FIG. 11 shows curved tenon piece 70 in a joint forming configuration with another curved tenon piece 75. Curved tenon piece 75 has a head 76 and an embedded magnet 77. For example, curved tenon piece 70 and curved tenon piece 75 are each composed of some combination of wood, plastic, metal or some other material suitable for forming a mortise and tenon joint.

Figure 12:
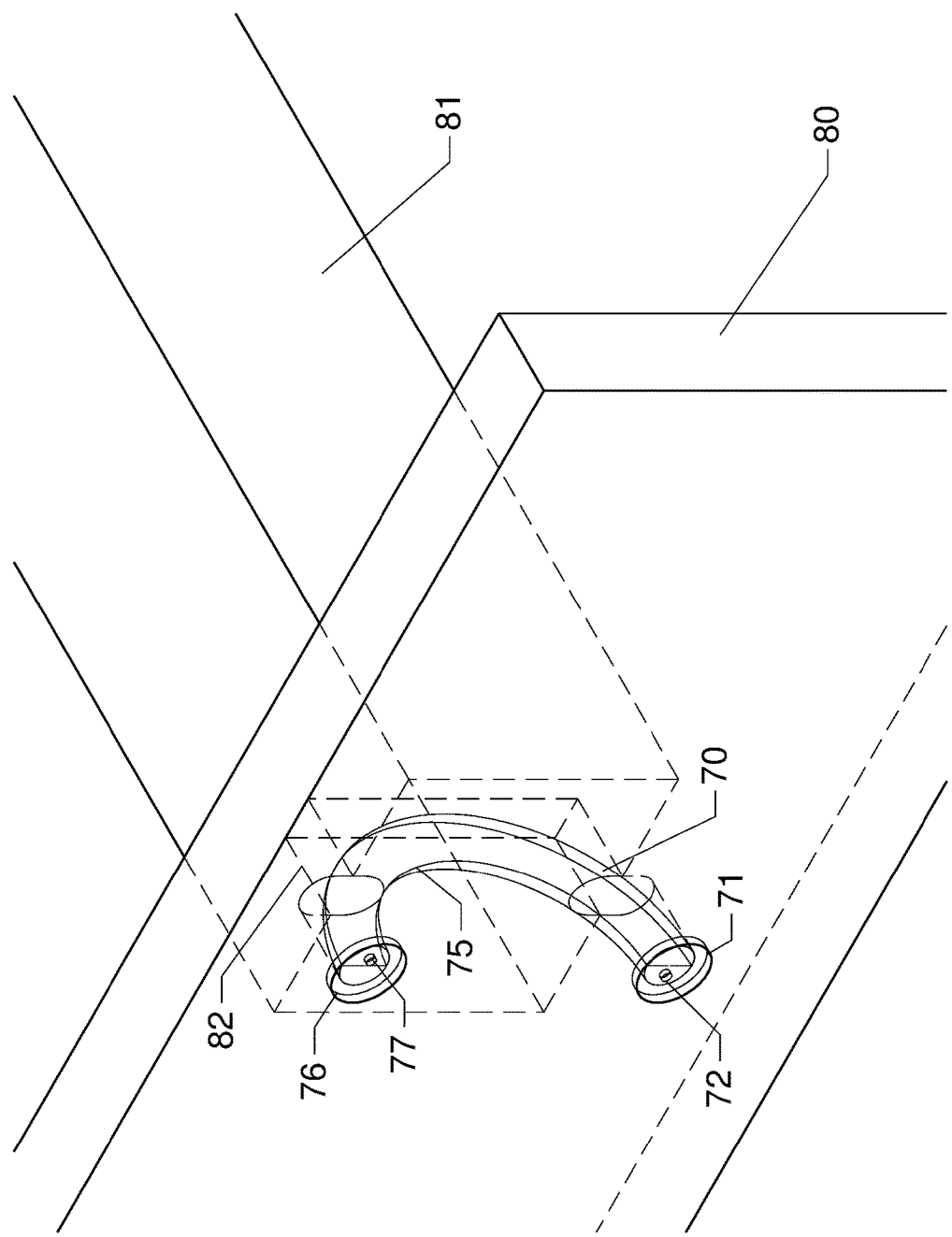
FIG. 12 and FIG. 13 show a leg being attached to a table by a joint formed using two curved tenon pieces in accordance with an implementation.
Figure 13:
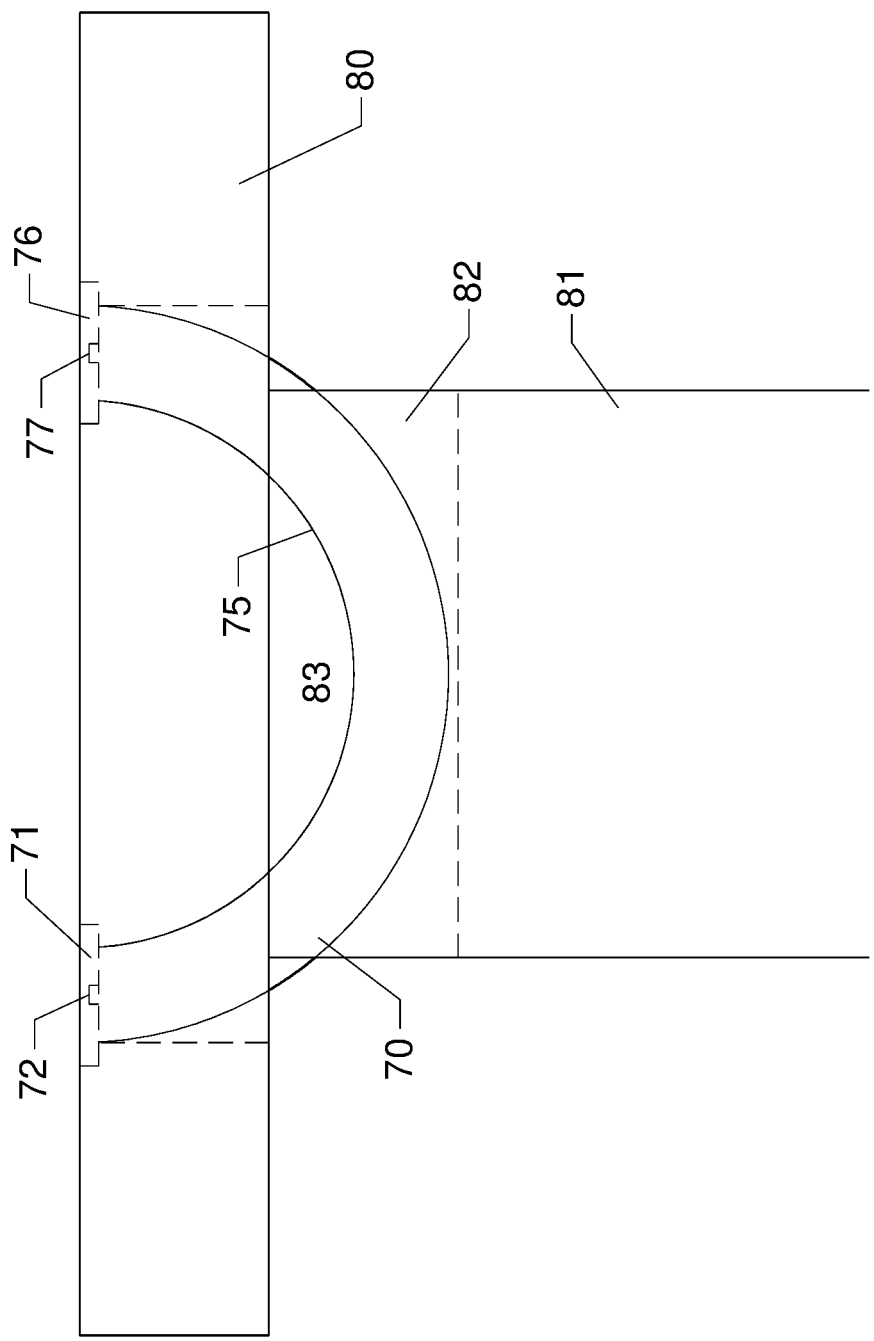
Figure 14:
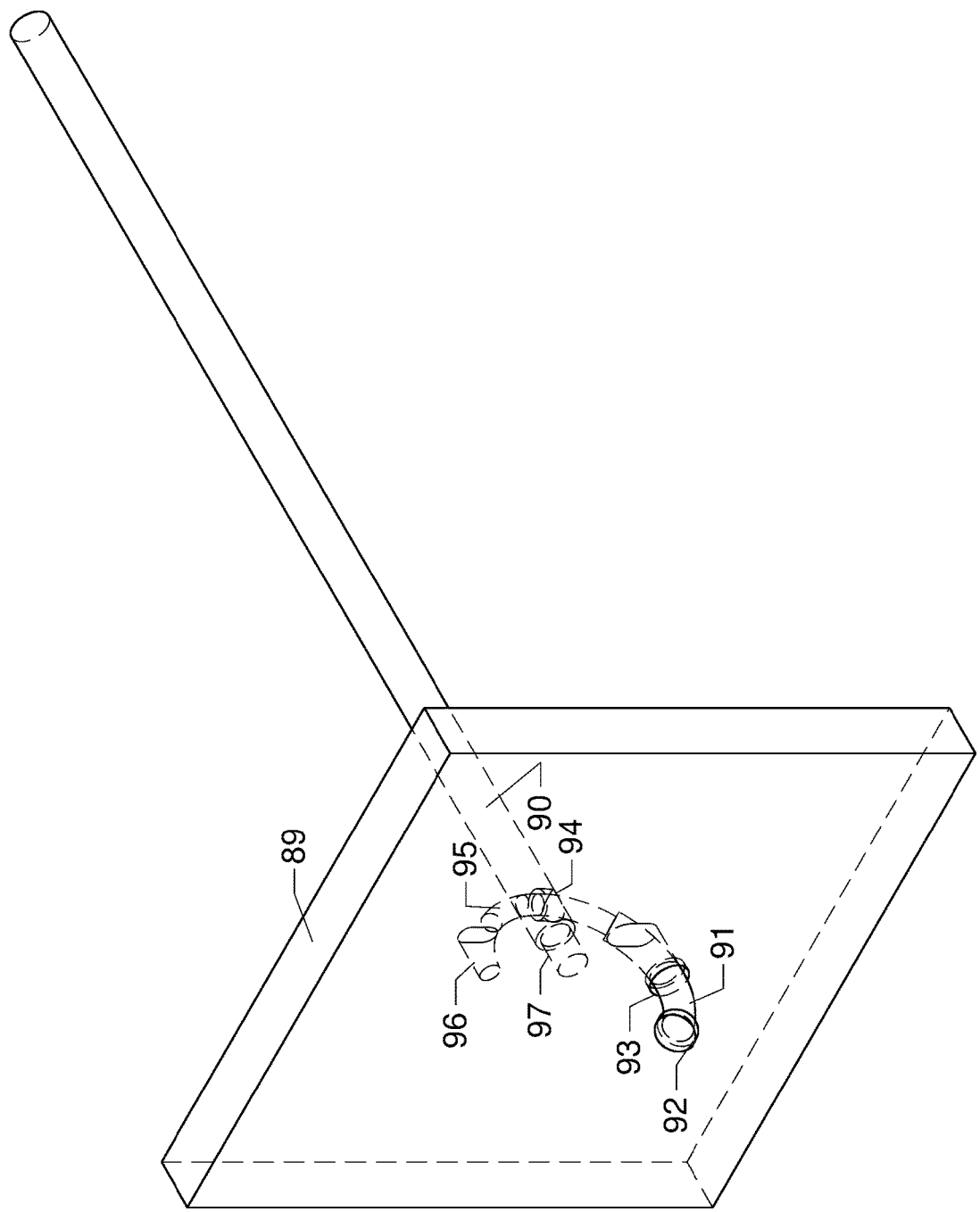
FIG. 14, FIG. 15, FIG. 16 and FIG. 17 show a leg being attached to a table by a joint formed using a curved tenon piece in accordance with an implementation.
Figure 15:
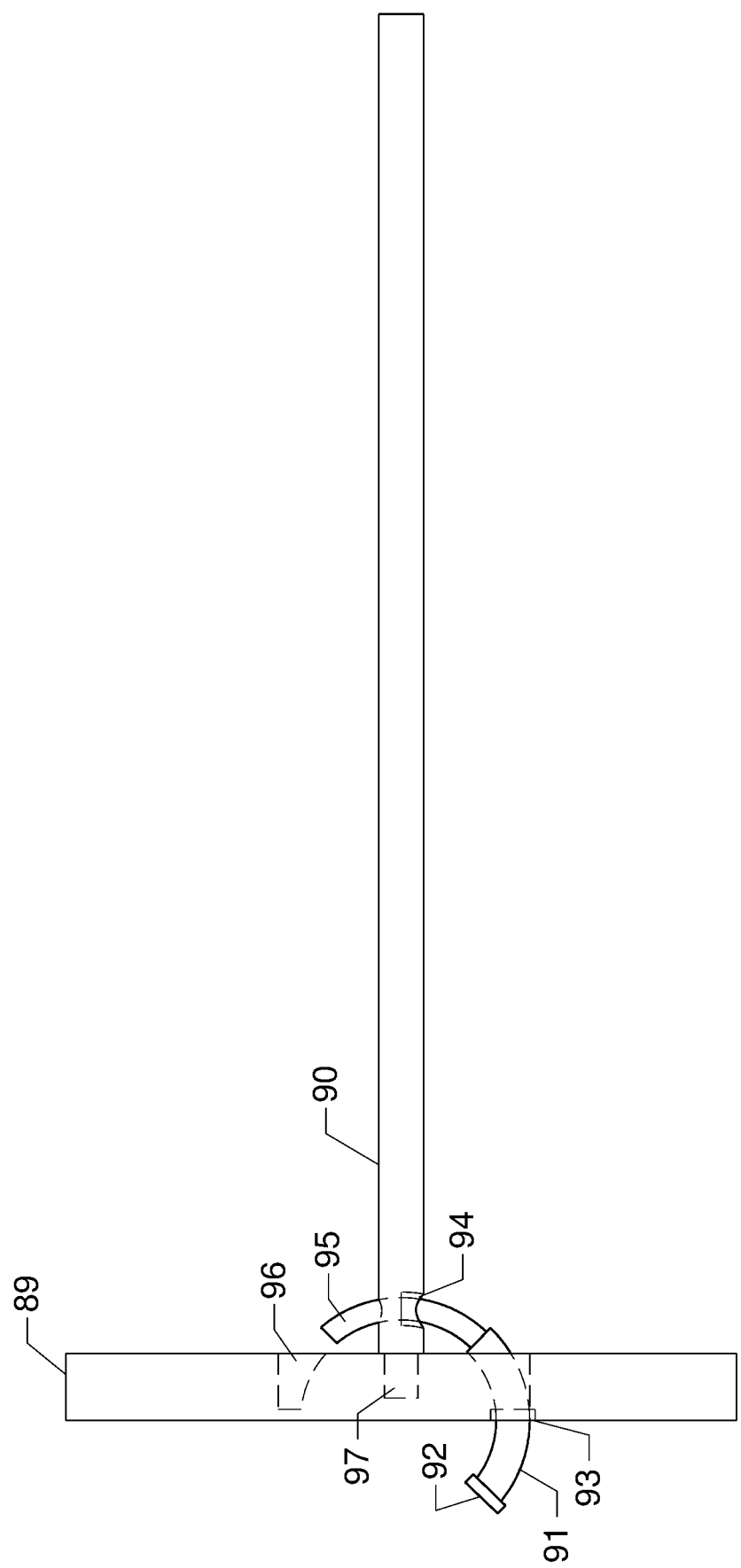
Figure 16:
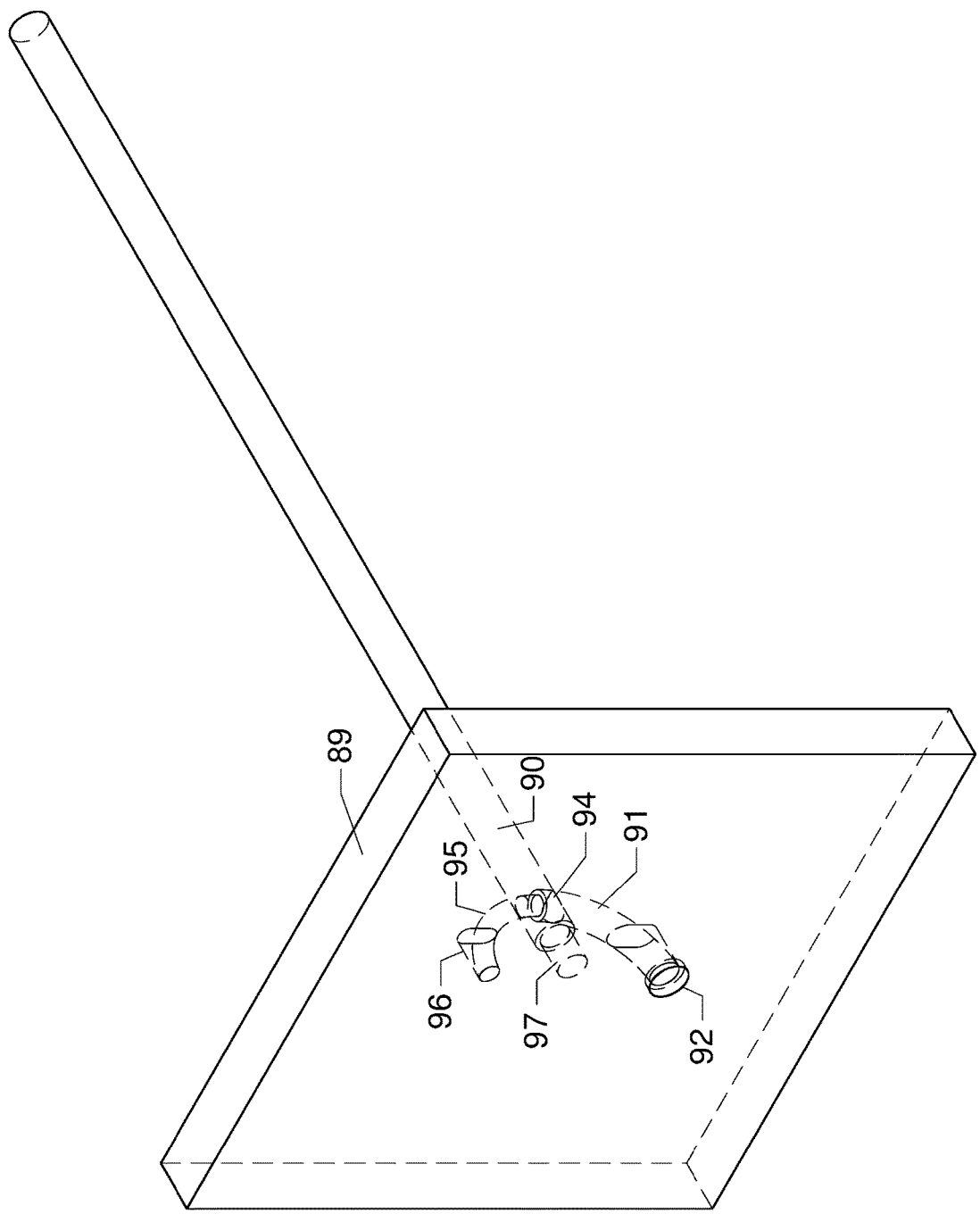
Figure 17:
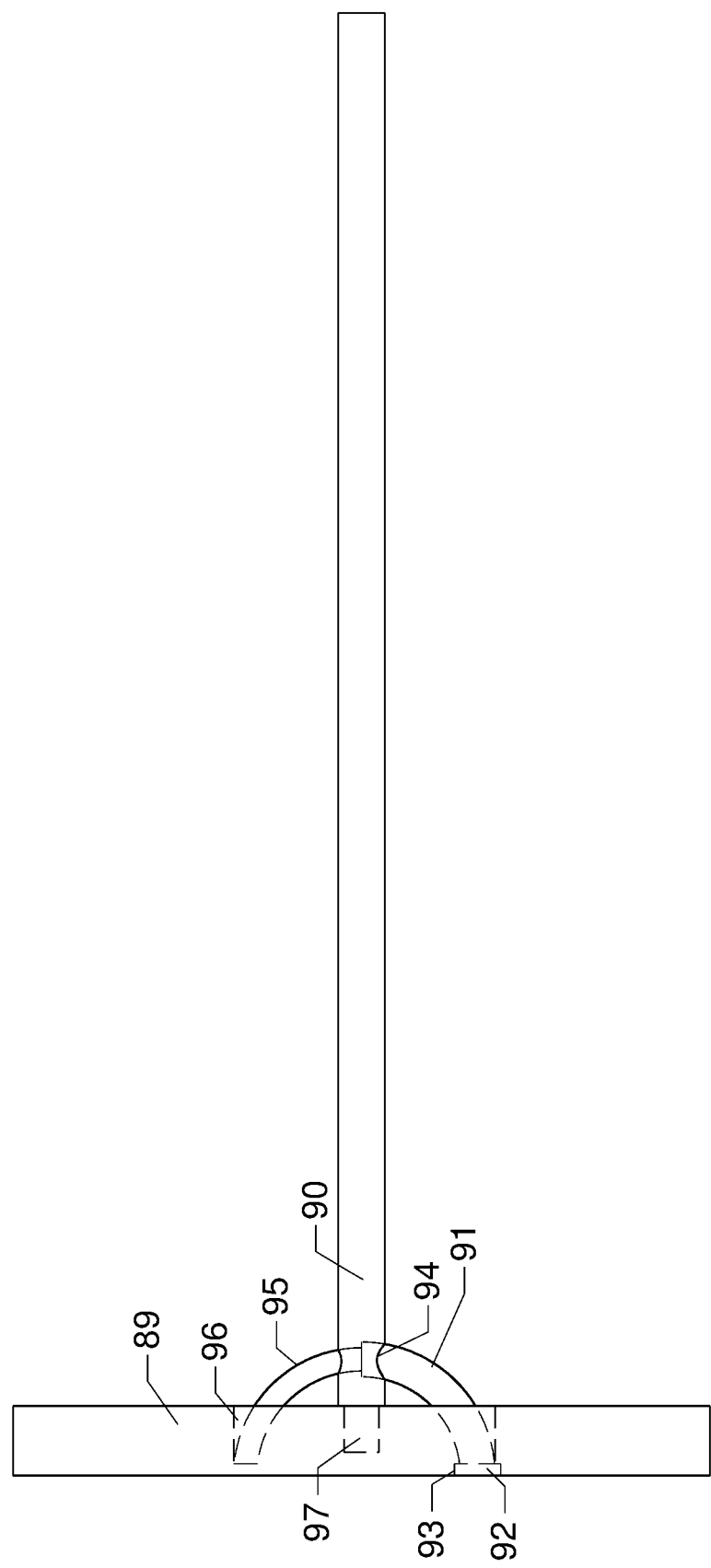

FIG. 12 and FIG. 13 show curved tenon piece 70 and curved tenon piece 75 used to hold a leg 81 to a tabletop 80. Curved tenon piece 70 and curved tenon piece 75 each extend through a hole in tabletop 80 and through a hollow region 82 of leg 81. Curved tenon piece 70 and curved tenon piece 75 hold a region 83 of leg 82 flush and tight against tabletop 8. A tip of curved tenon piece 75 rests against magnet 72 embedded in head 71 of curved tenon piece 70. Metal embedded in the tip of curved tenon piece 75 is held by a magnetic bond to embedded magnet 72. Alternatively, embedded magnet 72 can be omitted and friction can be used to hold curved tenon piece 75 in place. Likewise, a tip of curved tenon piece 70 rests against magnet 77 embedded in head 76 of curved tenon piece 75. Metal embedded in the tip of curved tenon piece 70 is held by a magnetic bond to embedded magnet 77. Alternatively embedded magnet 77 can be omitted and friction can be used to hold curved tenon piece 70 in place.

FIG. 14, FIG. 15, FIG. 16 and FIG. 17 show a leg 90 being attached to a tabletop 89 by a joint formed using a curved tenon piece 91. A tenon 97 of leg 90 is placed within a hole within table 89. Curved tenon piece 91 extends through a hole 93 in tabletop 89 and through a hole 94 in leg 90. A tenon 95 of tenon piece 91 continues into a hole 96 in tabletop 89. When assembled, head 92 of tenon piece 91 rests in hole 93 so that the top of head 92 is flush with the surface of tabletop 89.

Figure 18:
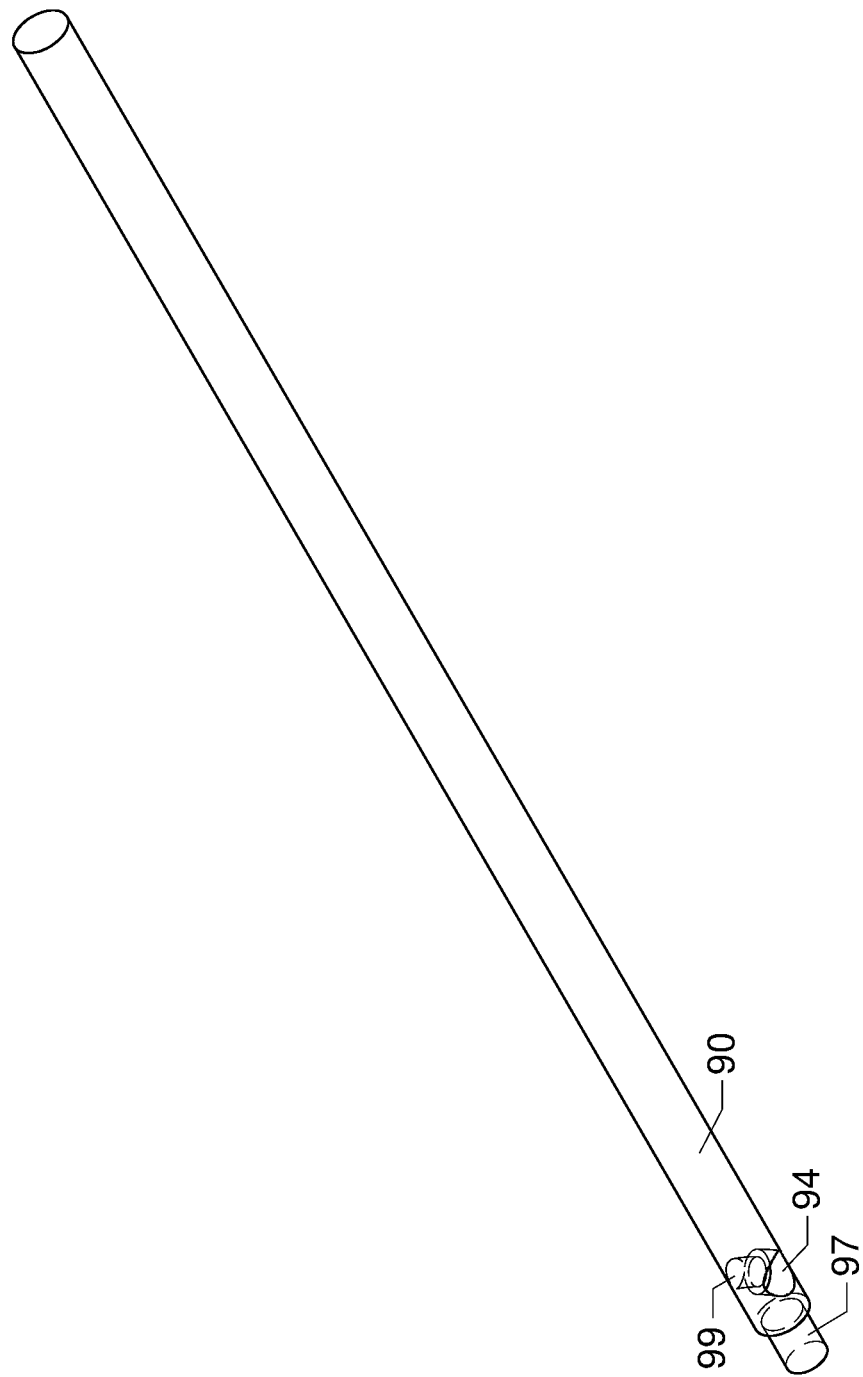
FIG. 18 and FIG. 19 show a table leg with a mortise that receives a curved tenon piece in accordance with an implementation.
Figure 19:
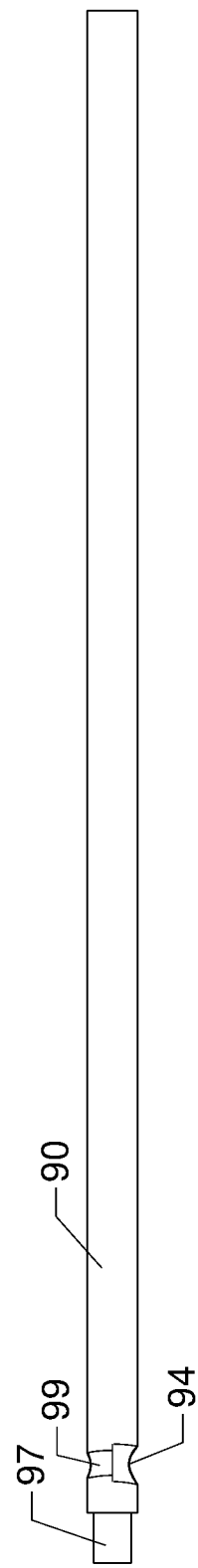

FIG. 18 and FIG. 19 show detail of leg 90. Hole 94 has a narrower end 99 through sized to allow tenon 95 of tenon piece 91 to pass through.

Figure 20:
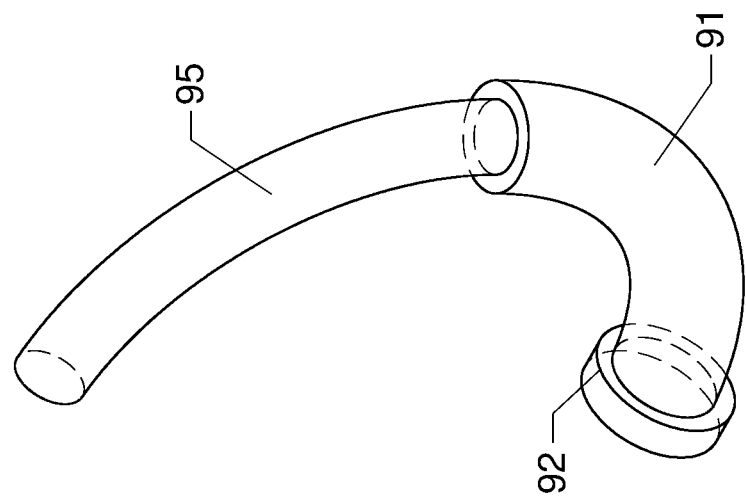
FIG. 20 shows a curved tenon piece in accordance with an implementation.

FIG. 20 shows additional detail of curved tenon piece 91.

Figure 21:
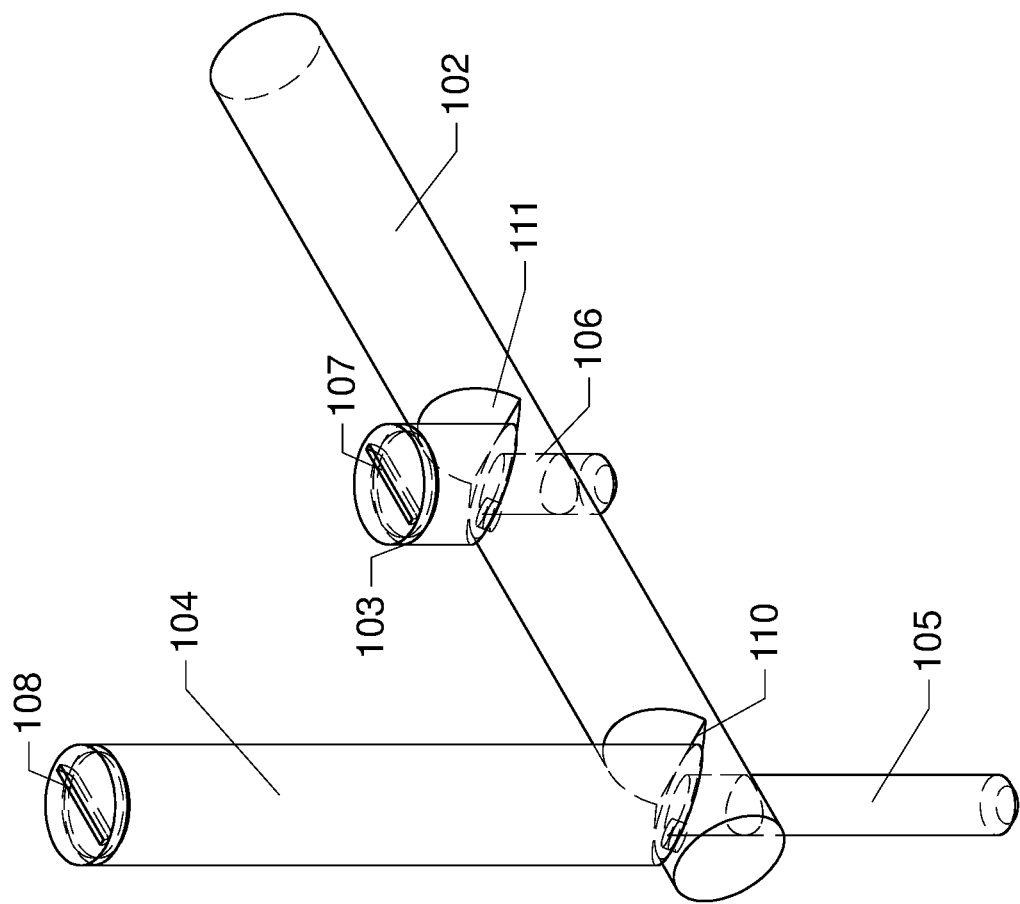
FIG. 21 shows joints formed between a mortise piece and multiple tenon pieces in accordance with an implementation.

FIG. 21 shows a tenon piece 103, a mortise piece 102 and a tenon piece 104. Tenon piece 104 includes a tenon 105 and a slot 108. When tenon piece 104 is fully engaged and flush with mortise piece 102 in a cut-out region 110, a user can place a coin or screwdriver in a slot 108 and twist to rotate tenon piece 104 to disengage tenon piece 104 from mortise piece 102.

Tenon piece 103 includes a tenon 106 and a slot 107. When tenon piece 103 is fully engaged and flush with mortise piece 102 in a cut-out region 111, a user can place a coin or screwdriver in a slot 107 and twist to rotate tenon piece 13 to disengage tenon piece 103 from mortise piece 102.

Figure 22:
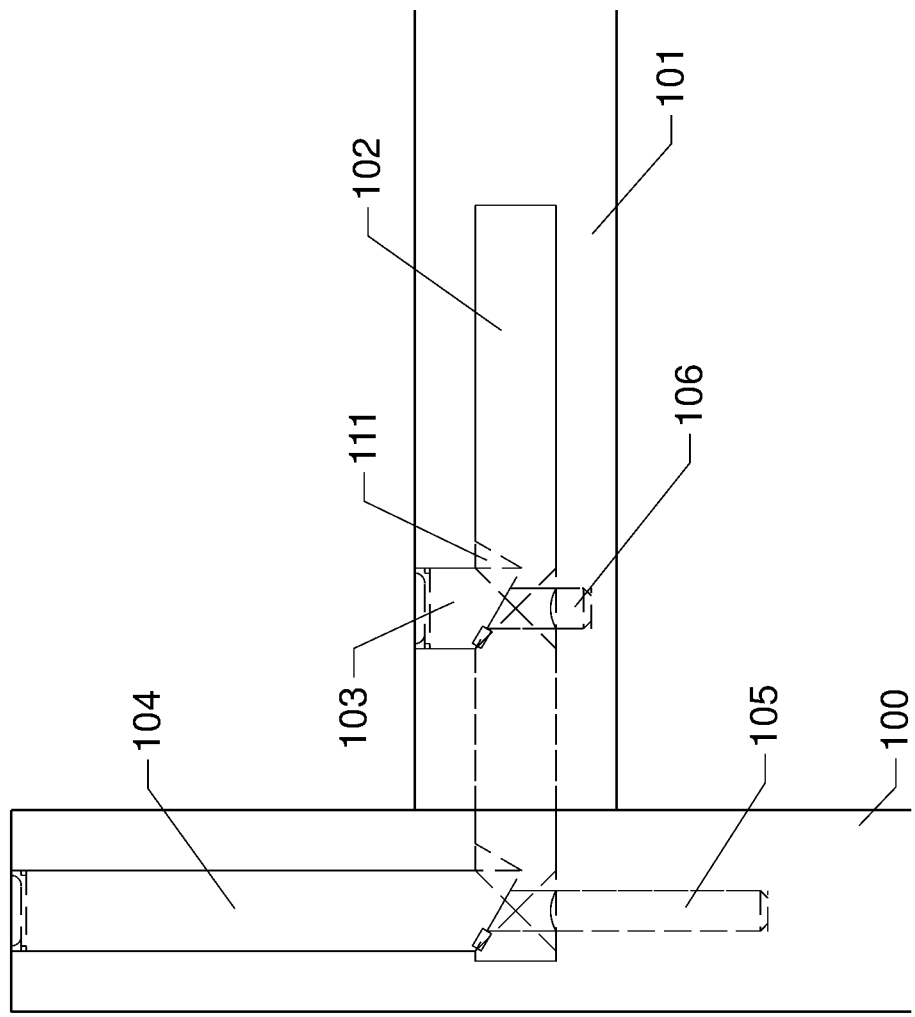
FIG. 22 and FIG. 23 show a leg being attached to a table by joints formed between a mortise piece and multiple tenon pieces in accordance with an implementation.
Figure 23:
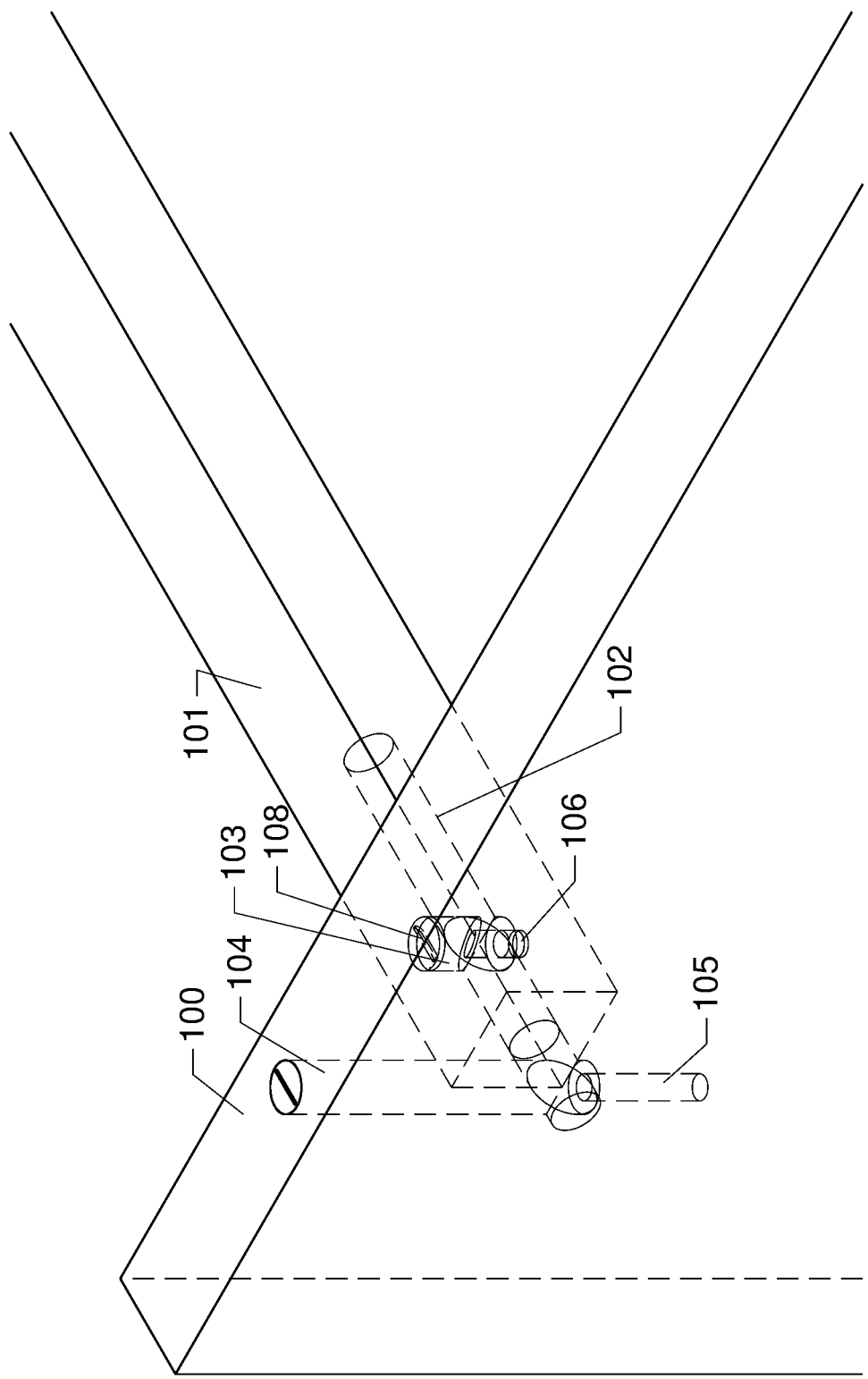

FIG. 22 and FIG. 23 show mortise piece 102, tenon piece 103 and tenon piece 104 used to join a leg 101 to a table 100.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A joint for furniture, comprising:
   a furniture surface, the furniture surface having a first hole that extends through a top of the furniture surface and out the furniture surface, and having a second hole with an opening in the furniture surface;
   a leg fitted to the furniture surface, the leg including a hole; and,
   a curved tenon piece, the curved tenon piece curving more than 90 degrees, wherein the curved tenon piece includes a head and wherein the curved tenon is shaped to enter the first hole through the top of the furniture surface, to exit the first hole, to extend through the hole in the leg and to enter into the second hole so that the head is flush with the top of the furniture surface.

2. A joint as in claim 1 wherein the leg is fitted to the top of the furniture surface by a tenon of the leg that is inserted into a mortise in a bottom of the furniture surface.

3. A joint as in claim 1 wherein the hole of the curved tenon piece is located below the furniture surface.

4. A joint as in claim 1 wherein the furniture is a table and the furniture surface is a tabletop.

5. A joint as in claim 1:
   wherein the second hole also extends through the top of the furniture surface; and,
   wherein the tenon joint additionally comprises:
      a second curved tenon piece, the curved tenon piece curving more than 90 degrees, wherein the second curved tenon piece includes a head and wherein the second curved tenon is shaped to enter the second hole through the top of the furniture surface, to exit the second hole, to extend through the hole in the leg and to enter into the second hole so that the head of the second curved tenon piece is flush with the top of the furniture surface.

6. A joint as in claim 1 wherein a magnetic bond between the curved tenon piece and the second curved tenon piece is established when the head of the curved tenon piece is flush with the top of the furniture surface and the head of the second curved tenon piece is flush with the top of the furniture surface.

7. A joint as in claim 1 wherein a magnetic bond between the curved tenon piece and the leg is established when the head of the curved tenon piece is flush with the top of the furniture surface.

8. A joint for furniture, comprising:
   a furniture piece, the furniture piece having a first hole that extends through a surface of the furniture piece and out the furniture piece, and having a second hole with an opening in the furniture piece;
   a leg fitted to the furniture piece, the leg including a hole; and,
   a curved tenon piece that includes a head, the curved tenon piece curved sufficiently to allow the curved tenon to enter the first hole through the surface of the furniture piece, to exit the first hole, to extend through the hole in the leg and to enter into the second hole so that the head leg is held snugly to the furniture piece by the curved tenon piece.

9. A joint as in claim 8 wherein the leg is fitted to the surface of the furniture piece by a tenon of the leg that is inserted into a mortise in the furniture piece.

10. A joint as in claim 8 wherein the hole of the curved tenon piece is located below the furniture piece.

11. A joint as in claim 8 wherein the furniture is a table and the furniture piece is a tabletop.

12. A joint as in claim 8:
   wherein the second hole also extends through the surface of the furniture piece; and,
   wherein the tenon joint additionally comprises:
      a second curved tenon piece, the curved tenon piece curving more than 90 degrees, wherein the second curved tenon piece includes a head and wherein the second curved tenon is shaped to enter the second hole through the surface of the furniture piece, to exit the second hole, to extend through the hole in the leg and to enter into the second hole.

13. A joint as in claim 8 wherein a magnetic bond between the curved tenon piece and the second curved tenon piece is established when the head of the curved tenon piece is against the surface of the furniture piece and the head of the second curved tenon piece is against the surface of the furniture piece.

14. A joint as in claim 8 wherein a magnetic bond between the curved tenon piece and the leg is established when the head of the curved tenon piece is against the surface of the furniture piece.

\* \* \* \* \*